Sept. 27, 1966 C. H. BLANCHARD ETAL 3,275,913
VARIABLE CAPACITOR
Filed Nov. 20, 1964

INVENTORS
Clayton H. Blanchard
Keith S. McIntosh
BY
Walter S. Zebrowski

3,275,913
VARIABLE CAPACITOR
Clayton H. Blanchard, Horseheads, N.Y., and Keith S. McIntosh, Derrick City, Pa., assignors to LRC Electronics Incorporated, Horseheads, N.Y., a corporation of New York
Filed Nov. 20, 1964, Ser. No. 412,755
9 Claims. (Cl. 317—249)

This invention relates to variable capacitors and more particularly to fine adjustment trimmer capacitors.

The various types of variable capacitors may be classed as the interleaving plate type, the variable pressure book type, and the telescoping tube type. The variable capacitor of the present invention is of the last mentioned tape. Variable capacitors of this general type commonly have telescoping cylindrical members separated by an air space or other dielectric material such as glass, ceramic, or plastic. In order to vary the capacitance of such a device the inner electrode is moved longitudinally with respect to the outer electrode so that the amount of overlap between them is increased or decreased. The inner electrode is caused to move through some form of threaded connection.

In order to satisfactorily serve their purpose such variable capacitors must be readily adjustable, and must not change capacitance when subjected to vibration. Furthermore, wear between moving parts must not introduce errors in capacitor setting, nor result in varying torque required to rotate the inner electrode. There should be no looseness or back lash between the moving parts. In addition variable capacitors should be of simple construction, have a long adjustment life, and be as small as possible for a given range of capacitance values. Heretofore trimmer capacitors did not have all of the above noted advantages.

It is an object of this invention to provide an economic variable capacitor of simple construction which is compact in size and has a long adjustment life.

Another object of this invention is to provide a trimmer capacitor requiring uniform torque for movement of the inner electrode.

A further object is to provide a trimmer capacitor having few parts.

Still another object is to provide a trimmer capacitor which maintains its setting while it is vibrated.

A still further object is to provide a trimmer capacitor the setting and operation of which is unaffected by wear of the moving parts.

Broadly, in one embodiment according to this invention a trimmer capacitor is provided having a hollow conductive tubular member terminated at one end by a flat threaded transverse portion. A threaded plate is integrally connected to the transverse portion in a coaxial parallel spaced relationship along the longitudinal axis thereof by means of a post at one edge of the plate and transverse portion. The threads in the plate are in register with the threads in the transverse portion. The inner electrode is provided in an axially movable core closely surrounding the tubular member at the transverse portion end thereof. A split circular spring is placed in the slot defined by the transverse portion, post, and plate causing the plate to flex about the post. A screw is then threaded into the transverse portion from the open end of the tubular member, passed through the split circular spring, and threaded through the plate with the end extending beyond. The movable core is fixedly connected to the extending end of the screw. A tube of dielectric material having a conductive coating on a portion of the outer surface thereof is provided closely surrounding said core and is attached to the tubular member at the end opposite the transverse portion. The conductive coating comprises the outer electrode.

Additional objects, features, and advantages of the present invention will become apparent to those skilled in the art, from the following detailed description and the attached drawing on which, by way of example, only the preferred embodiments of the invention are illustrated.

Figure 1:
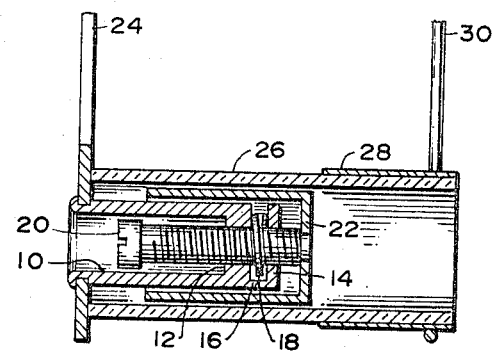
FIGURE 1 is a cross sectional view of the trimmer capacitor of this invention.

Referring now to FIGURE 1, a hollow metallic tubular member 10 is shown terminated at one end with a threaded transverse portion 12. A threaded plate 14 is integrally attached to transverse portion 12 by means of post 16. Plate 14 is in coaxial parallel spaced relationship with transverse portion 12 along the longitudinal axis thereof. The threads in plate 14 are in register with the threads in transverse portion 12. Post 16 acts as a hinge about which plate 14 can flex.

Figure 3:
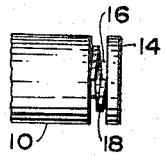
FIGURE 3 is a fragmentary view illustrating the split spring in place.
Figure 4:
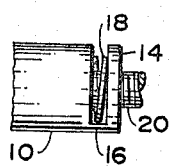
FIGURE 4 is a fragmentary view illustrating the split spring and screw in place.

Referring additionally to FIGURES 3 and 4, a split circular spring 18, of the "lock washer" type is placed in the slot defined by transverse portion 12, post 16 and plate 14 causing plate 14 to flex about post 16. The slot opens up as plate 14 flexes. Plate 14 is maintained in its original unflexed position by means of a suitable jig, clamp or the like, not shown and not part of this invention, while screw 20 is threaded into a transverse portion 12 from the open end of member 10. One familiar with the art can readily select suitable means for maintaining plate 14 in its unflexed position. Screw 20 is then passed through the center of spring and is threaded through plate 14 until it extends beyond it. Plate 14 can then be released whereupon the spring tends to flex it about post 16 causing plate 14 to exert a force on screw 20. The torque required to turn screw 20 can be carefully controlled by suitably selecting a spring, and the material and size of post 16.

An axially movable core 22 is disposed closely surrounding member 10 at the transverse portion thereof and is fixedly secured to the end of screw 20 which protrudes from plate 14. The core may be attached to said screw by welding, brazing, or the like.

Figure 2:
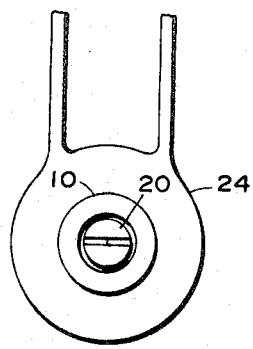
FIGURE 2 is an end view of the trimmer capacitor of this invention.

A suitable lead member 24 is then attached to member 10 at the end opposite the transverse portion by mechanical peaning or welding, for example. Lead member 24, as additionally shown in FIGURE 2, is particularly suitable for attachment to printed circuits.

A tube 26 of dielectric material such as glass, ceramic, plastic or the like is prepared by applying a conductive coating 28 to a portion of the exterior surface of said tube. For example, coating 28 may be applied as a band about one end of said tube. Conductive coating 28 may be formed of silver, aluminum, copper, tin, or the like. Suitable methods for applying a conductive coating are firing on a metallic paint, electroplating, dipping, spraying, or the like. Lead 30 is electrically connected to coating 28 by means of solder or the like.

Tube 26 is then attached to lead member 24 closely surrounding core 22. Tube 26 may be attached to member 24 by any method well known in the art as by a suitable adhesive, solder, or solder glass.

Core 22 comprises the inner movable electrode while coating 28 comprises the outer electrode. The capacitance is varied by turing screw 20 thereby changing the position of core 22 with respect to coating 28.

The hollow tubular member 10 with its transverse portion 12 and plate 14 may be readily formed by providing a tubular member with an internally threaded transverse portion at one end, and thereafter cutting a slot in said transverse portion perpendicular to the longitudinal axis of said member for a portion of its cross section thereby separating the transverse portion into two opposing parallel plates connected at one edge by a post.

Figure 5:
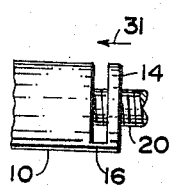
FIGURE 5 is a fragmentary view illustrating another embodiment of this invention.

It should be noted that hollow tubular member 10 may be formed as hereinabove described from metals having high resiliency, such as beryllium copper, spring brass, or spring steel for example. In such embodiments a circular spring need not be employed. Referring to FIGURE 5, after plate 14 is formed it is caused to be bent slightly about post 16 in the direction illustrated by arrow 31. Therefore, when screw 20 is threaded into the transverse portion and plate 14, said plate exerts a force on said screw thereby suitably controlling the torque required to turn screw 20.

Figure 6:
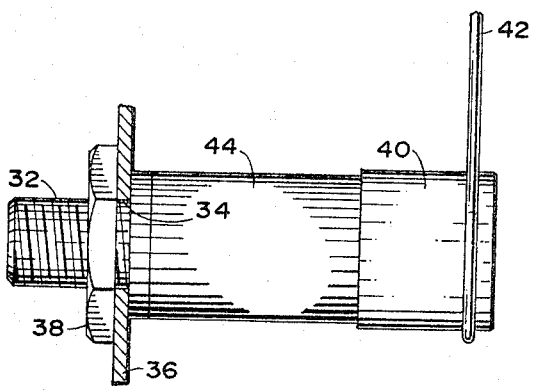
FIGURE 6 is a side view illustrating still another embodiment of this invention.

FIGURE 6 illustrates another embodiment of this invention suitable for panel mounting. Hollow tubular member 10 is formed as hereinabove described but has an externally threaded portion 32 extending from the open end. Portion 32 is then passed through aperture 34 in panel 36 and is secured in place by nut 38. In such a unit, the outer electrode 40 and its lead 42 may be formed in conjunction with dielectric tube 44 as heretofore described.

Figure 7:
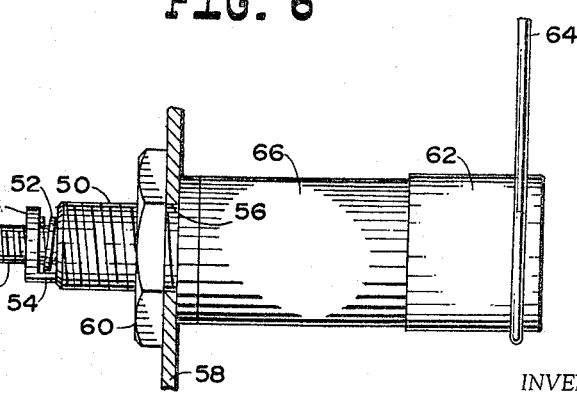
FIGURE 7 is a side view illustrating a further embodiment of this invention.

FIGURE 7 illustrates still another embodiment of this invention also suitable for panel mounting. The hollow tubular member is formed with the internally threaded transverse portion and plate end positioned at the exterior of the capacitor. Screw 46 is threaded through plate 48 and externally threaded portion 50 and is attached to the movable core as hereinabove described. Spring 52 is disposed within the slot defined by plate 48, post 54, and externally threaded portion 50. The externally threaded portion 50 is passed through aperture 56 in panel 58 and is secured in place by nut 60. In this embodiment, the outer electrode 62 and its lead 64 may be formed in conjunction with dielectric tube 66 as heretofore described.

Although the present invention has been described with respect to specific details of certain embodiments thereof, it is not intended that such details be limitations upon the scope of the invention except insofar as set forth in the following claims.

We claim:
1. A trimmer capacitor comprising
   a hollow conductive tubular member terminated at one end by a flat threaded transverse portion, the other end of said member being open,
   a plate in a spaced relationship with said transverse portion along the longitudinal axis thereof integrally connected thereto by means of a post at one edge of said plate and transverse portion, said plate having threads in register with the threads in said transverse portion,
   an axially movable core closely surrounding said tubular member,
   means disposed between said transverse portion and said plate for exerting a force on said plate to cause it to flex about said post,
   a screw threaded through said transverse portion and said plate fixedly connected to said core,
   a tube of dielectric material closely surrounding said core attached to said tubular member at said other end thereof, and
   a conductive coating on the outer surface of said tube for a portion of its length.

2. The trimmer capacitor of claim 1 wherein said means comprise a split circular spring, said screw passing through said spring.

3. The trimmer capacitor of claim 2 wherein said dielectric material is glass.

4. The trimmer capacitor of claim 3 wherein said conductive coating is a metal selected from the group consisting of silver, copper, tin and aluminum.

5. A trimmer capacitor comprising
   a hollow conductive tubular member terminated at one end by a slotted transverse portion, the slot being perpendicular to the longitudinal axis of said member and separating said portion in two opposing parallel plates connected at one edge by a post, said portion being threaded along said longitudinal axis, the other end of said member being open,
   an axially movable core closely surrounding said tubular member about said one end,
   a split circular spring disposed within said slot,
   a screw threaded through said plates fixedly connected to said core, said screw passing through said circular spring,
   a tube of dielectric material closely surrounding said core attached to said tubular member at said other end thereof, and
   a conductive coating on the outer surface of said tube for a portion of its length.

6. In a variable electrical capacitor adjusting means for said capacitor comprising
   a hollow conductive tubular member terminated at one end by a flat threaded transverse portion, the other end of said member being open,
   a plate in a spaced relationship with said transverse portion along the longitudinal axis thereof integrally connected thereto by means of a post at one edge of said plate and transverse portion, said plate having threads in register with the threads in said transverse portion,
   an axially movable core closely surrounding said tubular member,
   means disposed between said transverse portion and said plate for exerting a force on said plate to cause it to flex about said post, and
   a screw threaded through said transverse portion and said plate fixedly connected to said core for controlled movement of said core along said longitudinal axis.

7. A trimmer capacitor comprising
   a hollow conductive tubular member terminated at one end by a slotted transverse portion, the slot being perpendicular to the longitudinal axis of said member and separating said transverse portion in two opposing parallel plates connected at one edge by a post, said transverse portion being internally threaded along said longitudinal axis, the other end of said member being open and having an externally threaded portion, said externally threaded portion being passable through an apertured panel,
   an axially movable core closely surrounding said tubular member about said one end,
   a split circular spring disposed within said slot,
   a screw threaded through said plates fixedly connected to said core for controlled movement of said core along said longitudinal axis, said screw passing through said spring,
   a tube of dielectric material closely surrounding said core attached to said tubular member intermediate said one end and said externally threaded portion, and
   a conductive coating on the outer surface of said tube for a portion of its length.

8. A trimmer capacitor comprising
   a hollow conductive member terminated at one end by a slotted transverse portion, the slot being perpendicular to the longitudinal axis of said member and separating said transverse portion in two opposing parallel plates connected at one edge by a post, said transverse portion being internally threaded along said longitudinal axis, said one end also being externally threaded and passable through an apertured panel, an axially movable core closely surrounding said tubular member about the other end thereof, a split circular spring disposed within said slot, a screw threaded through said plates fixedly connected to said core for controlled movement of said core along said longitudinal axis, said screw passing through said spring, a tube of dielectric material closely surrounding said core attached to said tubular member intermediate its ends, and a conductive coating on the outer surface of said tube for a portion of its length.

9. A trimmer capacitor comprising a hollow conductive tubular member terminated at one end by a slotted transverse portion, the slot being perpendicular to the longitudinal axis of said member and separating said portion in two opposing substantially parallel plates connected at one edge by a post, said portion being threaded along said longitudinal axis, the other end of said member being open, an axially movable core closely surrounding said tubular member about said one end, a screw threaded through said plates fixedly connected to said core, means for controlling the torque required to turn said screw, a tube of dielectric material closely surrounding said core attached to said tubular member at said other end thereof, and a conductive coating on the outer surface of said tube for a portion of its length.

References Cited by the Examiner

UNITED STATES PATENTS 3,071,716   1/1963   Young _____ 317—249

FOREIGN PATENTS 604,810   9/1960   Canada.
648,228   1/1951   Great Britain.

LEWIS H. MYERS, *Primary Examiner.*

ROBERT K. SCHAEFER, *Examiner.*

E. GOLDBERG, *Assistant Examiner.*